(12) United States Patent
Kim et al.

(10) Patent No.: US 11,536,806 B2
(45) Date of Patent: Dec. 27, 2022

(54) LIGHT DETECTION AND RANGING DEVICE AND METHOD OF DRIVING THE SAME

(71) Applicant: SAMSUNG ELECTRONICS CO., LTD., Suwon-si (KR)

(72) Inventors: Jungwoo Kim, Hwaseong-si (KR); Tatsuhiro Otsuka, Suwon-si (KR); Yongchul Cho, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 736 days.

(21) Appl. No.: 16/535,902

(22) Filed: Aug. 8, 2019

(65) Prior Publication Data
US 2020/0174104 A1 Jun. 4, 2020

(30) Foreign Application Priority Data
Dec. 3, 2018 (KR) .................. 10-2018-0153716

(51) Int. Cl.
*G01S 7/481* (2006.01)
*G01S 17/10* (2020.01)

(52) U.S. Cl.
CPC .......... *G01S 7/4817* (2013.01); *G01S 7/4815* (2013.01); *G01S 17/10* (2013.01)

(58) Field of Classification Search
CPC .............................. G01S 17/08; G01S 17/894
See application file for complete search history.

(56) References Cited

U.S. PATENT DOCUMENTS

| | | | |
|---|---|---|---|
| 2006/0227317 A1 | 10/2006 | Henderson et al. | |
| 2014/0043309 A1 | 2/2014 | Go et al. | |
| 2017/0242108 A1 | 8/2017 | Dussan et al. | |
| 2017/0307759 A1 | 10/2017 | Pei et al. | |
| 2017/0350983 A1* | 12/2017 | Hall | G01S 17/10 |
| 2019/0204419 A1 | 7/2019 | Baba et al. | |
| 2021/0199776 A1* | 7/2021 | Haag | G01S 7/4817 |

FOREIGN PATENT DOCUMENTS

| | | |
|---|---|---|
| CN | 206773188 U | 12/2017 |
| KR | 10-2018-0058067 A | 5/2018 |
| WO | 2018003852 A1 | 1/2018 |

OTHER PUBLICATIONS

Communication dated Mar. 19, 2020 from the European Patent Office in application No. 19192889.4.

* cited by examiner

*Primary Examiner* — Jerry T Jean Baptiste
(74) *Attorney, Agent, or Firm* — Sughrue Mion, PLLC

(57) ABSTRACT

Provided in a light detection and ranging (LiDAR) device including a scanning optical system including a plurality of light sources and a beam steering device, the scanning optical system being configured to scan an object with a plurality of irradiation beams projected from the plurality of light sources toward the object at a plurality of irradiation angles, respectively, a light detector including a plurality of pixel regions that are configured to separately detect the plurality of irradiation beams projected toward the object at the plurality of irradiation angles and reflected from the object, and a processor configured to control the scanning optical system and the light detector, and obtain information about the object based on the plurality of irradiation beams detected by the light detector.

17 Claims, 9 Drawing Sheets

LIGHT DETECTION AND RANGING DEVICE AND METHOD OF DRIVING THE SAME

CROSS-REFERENCE TO RELATED APPLICATION

This application claims priority from Korean Patent Application No. 10-2018-0153716, filed on Dec. 3, 2018 in the Korean Intellectual Property Office, the disclosure of which is incorporated herein in its entirety by reference.

BACKGROUND

1. Field

Example embodiments of the present disclosure relate to a light detection and ranging (LiDAR) device and a method of driving the LiDAR device.

2. Description of the Related Art

Light detection and ranging (LiDAR) systems are used in a variety of fields such as aerospace, geology, 3D mapping, automobiles, robots, and drones.

LiDAR systems use a method of measuring the time that light needs to travel back and forth (hereinafter referred to as a time of flight (TOF) method) as a basic operating principle. That is, after light is transmitted toward an object, a sensor receives light reflected from the object, and the TOF of the light is measured using a high-speed electric circuit. The distance to the object may be calculated using the TOF. A depth image of the object may be processed by using calculated distances to positions of the object.

In this method, however, the resolution of images obtainable within a given frame time is limited because of the speed of light is limited.

SUMMARY

One or more example embodiments provide LiDAR devices having an improved image resolution and methods of driving the LiDAR devices.

Additional aspects will be set forth in part in the description which follows and, in part, will be apparent from the description, or may be learned by practice of example embodiments.

According to an aspect of an example embodiment, there is provided a light detection and ranging (LiDAR) device including a scanning optical system including a plurality of light sources and a beam steering device, the scanning optical system being configured to scan an object with a plurality of irradiation beams projected from the plurality of light sources toward the object at a plurality of irradiation angles, respectively, a light detector including a plurality of pixel regions that are configured to separately detect the plurality of irradiation beams projected toward the object at the plurality of irradiation angles and reflected from the object, and a processor configured to control the scanning optical system and the light detector, and obtain information about the object based on the plurality of irradiation beams detected by the light detector.

An angle between the plurality of irradiation beams projected from the plurality of light sources toward the object may be equal to or greater than an angle resolution of the light detector.

The plurality of pixel regions may be provided in the light detector such that the plurality of irradiation beams that are projected onto the object at the plurality of irradiation angles and reflected from the object are incident on different pixel regions among the plurality of pixel regions.

An angle between the plurality of irradiation beams projected from the plurality of light sources toward the object may be equal to or greater than 1°.

The plurality of light sources may be configured to emit the plurality of irradiation beams toward the object simultaneously or within a predetermined period of time.

The predetermined period of time may be 1 μs or less.

The processor may be further configured to determine a distance to the object based on the irradiation angles and a time of flight of the plurality of irradiation beams reflected from the object and perform data processing to analyze a position of the object and a shape of the object.

The processor may be further configured to control the scanning optical system to scan the object by dividing a region of the object into a number of regions corresponding to a number of the plurality of light sources.

The processor may be further configured to control the scanning optical system to select a number of the plurality of light sources and to scan the object based on the selected light sources.

The processor may be further configured to set the number of light sources to be selected based on a reference period of time and an image resolution to process one image frame of the object.

The plurality of pixel regions may include a plurality of light detection elements, respectively, and each of the plurality of light detection elements may include at least one of an avalanche photo diode and a single photon avalanche diode.

The light detector may include a plurality of time counters configured to respectively measure times of flight of the plurality of irradiation beams detected by the plurality of pixel regions.

The light detector may further include a plurality of current-to-voltage conversion circuits configured to convert a plurality of currents respectively output from the plurality of pixel regions into a plurality of voltages, a plurality of amplifiers configured to amplify the plurality of voltages respectively output from the plurality of current-to-voltage conversion circuits, and a plurality of peak detectors configured to respectively detect a plurality of peaks in a plurality of signals amplified by the plurality of amplifiers.

The beam steering device may include a scanning mirror configured to adjust an irradiation angle of each of the plurality of irradiation beams projected from the plurality of light sources by mechanical rotation.

The beam steering device may include an optical phased array configured to adjust an irradiation angle of each of the plurality of irradiation beams projected from the plurality of light sources by phase control.

According to an aspect of an example embodiment, there is provided a method of driving a light detection and ranging (LiDAR) device, the method including projecting a plurality of irradiation beams toward an object at a plurality of irradiation angles using a plurality of light sources, respectively, separately detecting the plurality of irradiation beams projected toward the object at the plurality of irradiation angles and reflected from the object, and obtaining information about a position and a shape of the object based on the detection.

An angle between the plurality of irradiation beams projected from the plurality of light sources toward the object may be equal to or greater than an angle resolution of a light detector.

The plurality of irradiation beams may be projected by the plurality of light sources toward the object simultaneously or within a predetermined period of time.

The method may further include setting the number of light sources from among the plurality of light sources to be used to project the plurality of irradiation beams toward the object.

The number of light sources to be used may be set based on a reference period of time and an image resolution to process one image frame of the object.

The plurality of irradiation beams that are projected onto the object at the plurality of irradiation angles and reflected from the object may be detected by different pixel regions among a plurality of pixel regions.

According to an aspect of another example embodiment, there is provided a light detection and ranging (LiDAR) device including a scanning optical system including a plurality of light sources and a beam steering device and configured to scan an object, the plurality of light sources being configured to respectively and substantially simultaneously emit a plurality of irradiation beams toward the beam steering device and the beam steering device being configured to steer the plurality of irradiation beams toward an object at a plurality of irradiation angles, respectively, the substantially simultaneously being simultaneous or 1 µs or less, a two-dimensional light detector array of a plurality of pixel regions, each of the plurality of pixel regions being configured to separately detect a different beam from among the substantially simultaneously emitted plurality of irradiation beams projected toward the object and reflected from the object, and a processor configured to control the scanning optical system and the light detector, and obtain information about the object based on the plurality of irradiation beams detected by the light detector.

An image resolution of one image of the object may correspond to a number of the plurality of light sources.

The processor may be further configured to control the scanning optical system to select a number of the plurality of light sources and to scan the object based on the selected light sources.

The processor may be further configured to set the number of light sources to be selected based on a reference period of time and an image resolution to process one image frame of the object.

BRIEF DESCRIPTION OF THE DRAWINGS

The above and/or other aspects will become apparent and more readily appreciated from the following description of example embodiments, taken in conjunction with the accompanying drawings in which.

DETAILED DESCRIPTION

Figure 1:
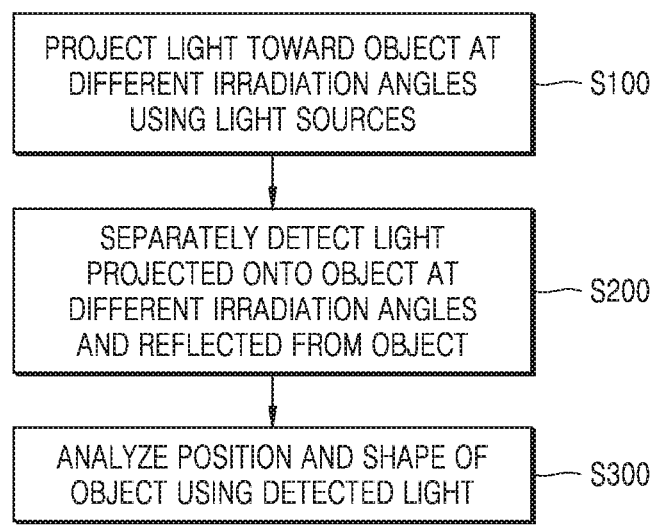
FIG. 1 is a flowchart schematically illustrating a method of driving a light detection and ranging (LiDAR) device according to an example embodiment.

Reference will now be made in detail to example embodiments of which are illustrated in the accompanying drawings, wherein like reference numerals refer to like elements throughout and the sizes of elements may be exaggerated for clarity of illustration. In this regard, example embodiments may have different forms and should not be construed as being limited to the descriptions set forth herein. Accordingly, example embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

In the following description, when an element is referred to as being "above" or "on" another element, it may be directly on the other element while making contact with the other element or may be above the other element without making contact with the other element.

It will be further understood that the terms "comprises" and/or "comprising" used herein specify the presence of stated features or elements, but do not preclude the presence or addition of one or more other features or elements.

An element referred to with the definite article or a demonstrative pronoun may be construed as the element or the elements even though it has a singular form.

Operations of a method may be performed in appropriate order unless explicitly described in terms of order or described to the contrary. That is, operations are not limited to the order in which the operations are described. In the present disclosure, examples or exemplary terms (for example, "such as" and "etc.") are used for the purpose of description and are not intended to limit the scope of the present disclosure unless defined by the claims.

Terms such as "unit" or "module" are used to denote a unit having at least one function or operation and implemented with hardware, software, or a combination of hardware and software.

FIG. 1 is a flowchart schematically illustrating a method of driving a light detection and ranging (LiDAR) device according to an example embodiment.

The method of driving a LiDAR device includes an operation S100 in which a plurality of light sources project light toward an object at different irradiation angles and an operation S200 in which light projected onto the object at different irradiation angles and reflected from the object is separately detected. In addition, the method of driving a LiDAR device includes an operation S300 in which information about the position and shape of the object is obtained using the detected light.

In the operation S100 of projecting light, light is projected from the plurality of light sources toward the object at different irradiation angles. Thus, when detecting light reflected from the object, the light may be separated according to the plurality of light sources. To this end, the difference between irradiation angles of light emitted from the plurality of light sources toward the object may be set to be greater than the angle resolution of a light detector. For example, the difference between irradiation angles may be about 1° or greater. The plurality of light sources may not be required to emit light at the same time. For example, the plurality of light sources may emit light toward the object with a time difference equal to or less than a certain value, for example, about 1 µs.

The method of driving a LiDAR device of the example embodiment may obtain information about an object within a given frame time, a reference period of time given for forming one image frame of the object, with an image resolution equal to or greater than a certain value. A LiDAR device to which the method is applicable will now be described.

Figure 2:
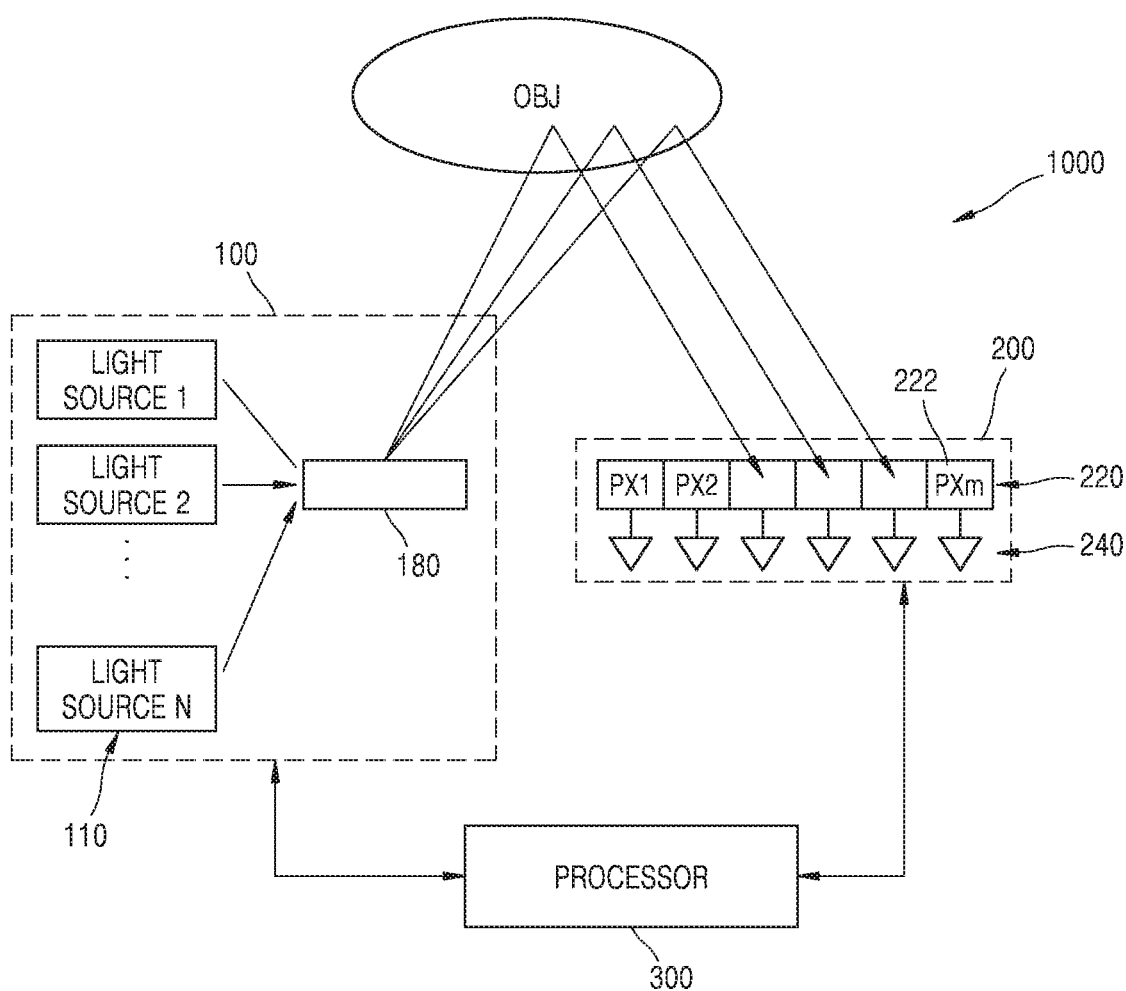
FIG. 2 is a block diagram schematically illustrating a LiDAR device according to an example embodiment.
Figure 3:
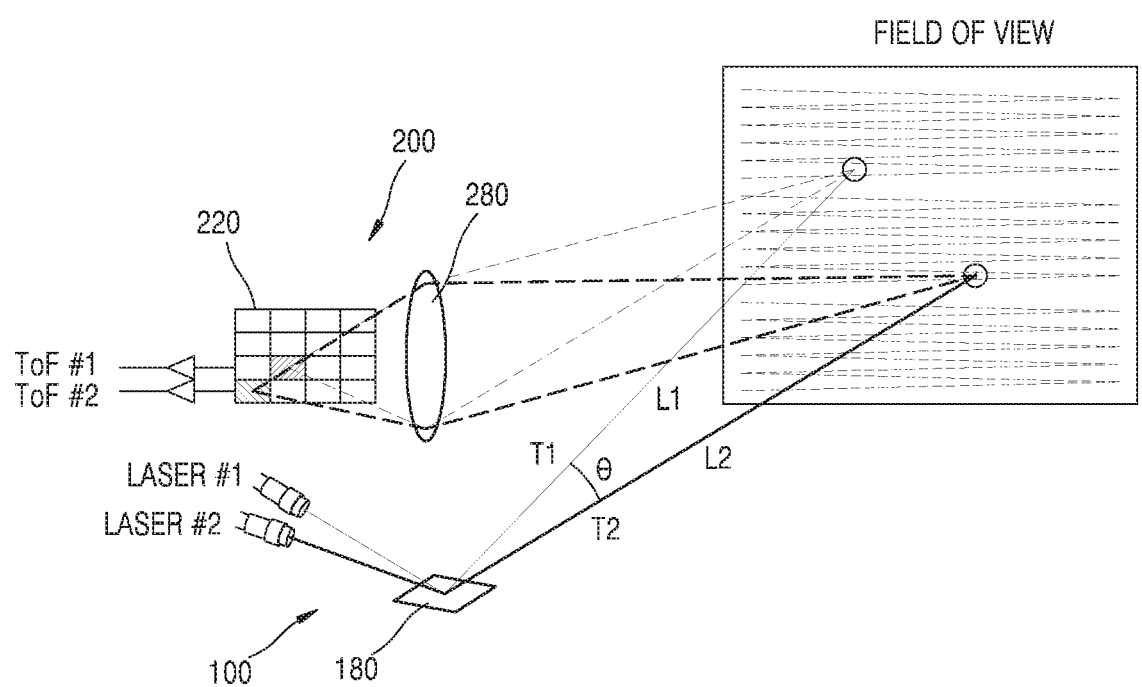
FIG. 3 is a view illustrating an example arrangement and operations of an scanning optical system and a light detector of the LiDAR device shown in FIG. 2.

FIG. 2 is a block diagram schematically illustrating a configuration of a LiDAR device 1000 according to an example embodiment, and FIG. 3 is a view illustrating an example arrangement and operations of a scanning optical system 100 and a light detector 200 of the LiDAR device 1000 illustrated in FIG. 2.

Referring to FIG. 2, the LiDAR device 1000 includes the scanning optical system 100 configured to scan an object OBJ with light, a light detector 200 configured to detect light projected from the scanning optical system 100 toward the object OBJ and reflected from the object OBJ, and a processor 300 configured to control the scanning optical system 100 and the light detector 200.

The scanning optical system 100 includes a light source unit 110 including a plurality of light sources and a beam steering device 180. The light source unit 110 and the beam steering device 180 may be arranged and operated such that the object OBJ may be scanned with light projected from the plurality of light sources toward the object OBJ through the beam steering device 180 at different irradiation angles.

The plurality of light sources of the light source unit 110 is configured to emit light for analyzing the position and shape of the object OBJ. The light source unit 110 may generate and project light having a predetermined wavelength. For example, the light source unit 110 may emit light in a wavelength band for analyzing the position and shape of the object OBJ, for example, in an infrared wavelength band. When light of the infrared wavelength band is used, the light emitted by the light source unit 110 may be prevented from mixing with natural light of a visible wavelength band such as sunlight. However, the light source unit 110 is not limited to emitting light of the infrared band. That is, the light source unit 110 may emit light in various wavelength bands. Examples of the plurality of light sources of the light source unit 110 may include a laser diode (LD), an edge emitting laser, a vertical-cavity surface emitting laser (VCSEL), a distributed feedback laser, a light emitting diode (LED), and a super luminescent diode (SLD). The light source unit 110 may generate and project light of different wavelength bands. The light source unit 110 may generate and project pulse light or continuous light.

The plurality of light sources of the light source unit 110 may emit light toward the object OBJ under the control of the processor 300. For example, the processor 300 may set the light emission direction or angle of each of the plurality of light sources, and may control the light source unit 110 such that the plurality of light sources emit light according to the light emission directions or angles set by the processor 300.

The beam steering device 180 aims light emitted from the light source unit 110 at the object OBJ in such a manner that the aiming direction is adjusted in a time sequence. Therefore, the object OBJ may be entirely scanned with point light emitted from the light source unit 110. A scanning mirror or an optical phased array may be used as the beam steering device 180.

The light detector 200 may include a plurality of pixel regions to separately detect light reflected from the object OBJ according to positions. As shown in FIG. 2, the light detector 200 may include a detector array 220 divided into a plurality of pixels PX1, PX2, ..., PXm. Light detection elements 222 may be respectively placed in the pixels PX1, PX2, ..., PXm. That is, the light detection elements 222 may form the pixels PX1, PX2, ..., PXm which are positionally distinguishable in the detector array 220, and the pixels PX1, PX2, ..., PXm may separately detect light reflected from the object OBJ according to the light emission angles of the light source unit 110.

The detector array 220 is shown as including m light detection elements 222 that are arranged in a one-dimensional manner, but this is merely an example. For example, the light detection elements 222 may be arranged in a two-dimensional manner.

The pixels PX1, PX2, ..., PXm of the light detector 200 are provided as basic units for separately detecting light projected from the scanning optical system 100 to the object OBJ at different irradiation angles and reflected from the object OBJ. Although the pixels PX1, PX2, ..., PXm are described as respectively including the light detection elements 222, this is an non-limiting example. The light detector 200 may be implemented as a single detector rather than an array of the light detection elements 222. In this case, different regions of the detector may serve as pixels to separate detected light according to positions.

The light detector 200 may further include a circuit unit 240 to measure the time of flight (TOF) of light detected by each of the light detecting elements 222. In addition, the light detector 200 may include optical elements to collect light reflected from the object OBJ in predetermined pixels.

The light detection elements 222 may be sensors capable of sensing light, such as light receiving elements configured to generate electric signals in response to light energy. The type of the light receiving elements is not particularly limited. The LiDAR device 1000 of the example embodiment uses a point scanning method as described above, and thus the intensity of light incident on the light detection elements 222 may be relatively low compared to examples using different methods such as a flash method. For example, avalanche photo diodes (APDs) or single photon avalanche diodes (SPADs) having high sensitivity may be used as the light detection elements 222. A circuit such as an analog front end (AFE) circuit or a time-to-digital converter (TDC) may be used depending on whether the light detection elements 222 of the light detector 200 include APDs or SPADs.

The processor 300 may perform a signal processing process using light detected by the light detector 200 to obtain information about the object OBJ. For example, the processor 300 may determine distances from a light source unit 110 to positions of the object OBJ on the basis of the irradiation angles of light to the object OBJ and the TOF of light reflected from the object OBJ, and may perform a data processing process to analyze the position and shape of the object OBJ.

Information analyzed by the processor 300, that is, information about the shape and position of the object OBJ may be transmitted to other units. For example, such information may be transmitted to a controller of an autonomous drive apparatus such as an unmanned vehicle or a drone that employs the LiDAR device 1000. In addition, such information may be used in smartphones, cellular phones, personal digital assistants (PDAs), laptops, personal computers (PCs), wearable devices, other mobile devices, or non-mobile computing devices.

In addition, the processor 300 may control the overall operation of the LiDAR device 1000 including the scanning optical system 100 and the light detector 200. The processor 300 may divide the region of the object OBJ into division regions by considering the number of light sources provided in the light source unit 110 and may output a control signal to the beam steering device 180 to scan all the division regions of the object OBJ using the beam steering device 180.

In addition, the processor 300 may control operations of the light source unit 110 and the light detector 200. For example, the processor 300 may perform a power supply control operation, an on/off control operation, a pulse wave (PW) or continuous wave (CW) generation control operation for the light source unit 110. In addition, the processor 300 may apply a control signal to each of the light detecting elements 222 of the light detector 200.

The LiDAR device 1000 may further include a memory to store programs and other data for operations of the processor 300.

The LiDAR device 1000 of the example embodiment may include the scanning optical system 100 configured to scan the object OBJ using point light by a point scanning method, and the entire region of the object OBJ may be scanned using the plurality of light sources of the scanning optical system 100.

For example, as shown in FIG. 3, two light sources such as a laser #1 and a laser #2 may project light onto the beam steering device 180 at different angles such that two irradiation beams L1 and L2 steered by the beam steering device 180 may have an angle θ therebetween. The angle θ is set such that the irradiation beams L1 and L2 irradiated on the object OBJ and reflected from the object OBJ may be separately detected at different pixels of the detector array 220. The angle θ may be determined by the resolution of the detector array 220 of the light detector 200 and the performance of other optical elements of the light detector 200 as well. For example, this angle θ may be about 1° or greater.

The two light sources, that is, the laser #1 and the laser #2, may emit light substantially simultaneously. For example, the laser #1 and the laser #2, may emit light simultaneously at the same time, or the two light sources the laser #1 and the laser #2 may emit light at different times T1 and T2. For example, the difference between the times T1 and T2 may be about 1 μs or less.

The direction of each of the irradiation beams L1 and L2 may be adjusted by the beam steering device 180 to entirely scan a predetermined field of view (FOV) including the object OBJ. The irradiation beams L1 and L2 reflected from the object OBJ may propagate toward different pixels, and a lens 280 may be further provided between the object OBJ and the detector array 220 as shown in FIG. 3 to focus the irradiation beams L1 and L2 onto different pixels of the two-dimensional detector array 220. Each of the pixels of the two-dimensional detector array 220 is connected to a circuit element configured to calculate TOFs. For example, a time of flight ToF #1 and a time of flight ToF #2 may be obtained through calculations by respective circuit elements.

The LiDAR device 1000 of the example embodiment may use a point scanning method in which the object OBJ is scanned using point light projected from the scanning optical system 100, and the LiDAR device 1000 may have a resolution limit because the speed of light is limited. For example, there is a limit to the number of pieces of information (point clouds) about an object that is obtainable within a given frame time, that is, within a reference period of time given for forming one image frame of the object, and thus the resolution of the LiDAR device 1000 is limited based on the number of pieces of information about the object obtained.

The following table illustratively shows approximate round trip times, resolution limits, and horizontal resolutions according to the distance to an object when the frame rate is 20 Hz, that is, when the frame time is 1/20 second. The horizontal resolutions are shown for two cases in which vertical resolution is 60 and 30, respectively.

TABLE 1

| Distance (meter) | Round trip time (sec) | Resolution limit | Horizontal resolution (V60) | Horizontal resolution (V30) |
|---|---|---|---|---|
| 10 | 6.69E−8 | 747500 | 12458 | 24917 |
| 30 | 2.01E−7 | 249167 | 4153 | 8306 |
| 50 | 3.34E−7 | 149500 | 2492 | 4983 |
| 100 | 6.69E−7 | 74750 | 1246 | 2492 |
| 150 | 1.00E−6 | 49833 | 831 | 1661 |
| 200 | 1.34E−6 | 37375 | 623 | 1246 |
| 300 | 2.01E−6 | 24917 | 415 | 831 |

As shown in Table 1, spatial resolution obtainable within a given frame time and a given field of view is limited, and when the field of view is increased while maintaining the spatial resolution, the frame rate is negatively affected. That is, the frame time is increased. This performance degradation increases as the distance to the object increases.

To improve this resolution limit, the LiDAR device 1000 of the example embodiment uses two or more light sources and maintains different irradiation angles such that light projected from the plurality of light sources may be separately detected by the light detector 200. Accordingly, resolution may be increased in proportion to the number of the light sources. For example, the resolution values shown in Table 1 above may be increased to the products of the resolution values and the number of the light sources of the LiDAR device 1000.

Figure 4A:
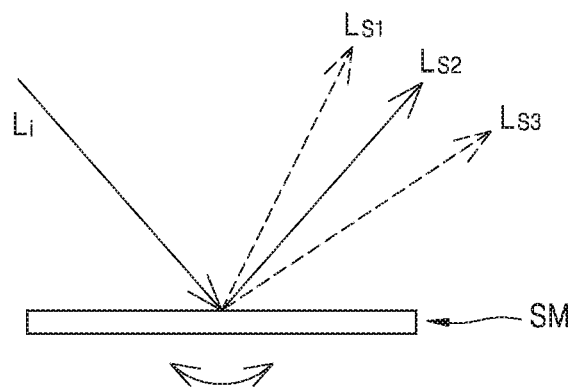
FIGS. 4A and 4B are views illustrating examples of a beam steering device of the LiDAR device shown in FIG. 2 and the principles of point scanning using the example beam steering devices.
Figure 4B:
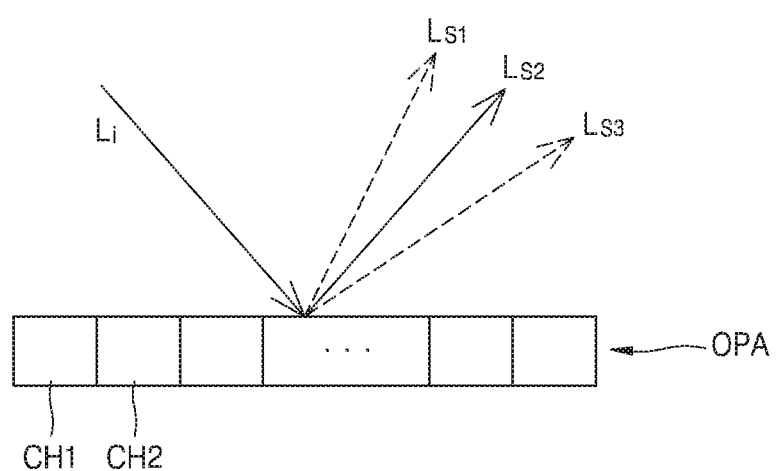

FIGS. 4A and 4B are views illustrating examples of the beam steering device 180 of the LiDAR device 1000 shown in FIG. 2 and the principles of point scanning using the example beam steering device.

Referring to FIG. 4A, the direction of a reflection surface of a scanning mirror SM is adjusted by mechanically rotating the scanning mirror, and thus the steering direction of incident light $L_i$ is adjusted. The direction in which the incident light $L_i$ is steered may be sequentially adjusted to directions $L_{S1}$, $L_{S2}$, and $L_{S3}$ according to the rotation angle of the scanning mirror SM. Although the scanning mirror SM is illustrated as being uniaxially rotated, the scanning mirror SM is not limited thereto. The scanning mirror SM may be biaxially rotated. That is, the scanning mirror SM may be rotated about two rotation axes. In addition, although the scanning mirror SM is illustrated as having a single reflection surface, this is a non-limiting example. In an example, the scanning mirror SM may have an array of mirror elements, and the direction of each of the mirror elements may be adjusted to steer incident light $L_i$ toward the object OBJ.

Referring to FIG. 4B, an optical phased array OPA may include a plurality of channels CH1, CH2, . . . . Phase change values for changing the phase of incident light $L_i$ may be respectively set for the channels CH1, CH2, . . . to adjust the direction in which the incident light $L_i$ is steered and output.

Each of the channels CH1, CH2, . . . of the optical phased array OPA may include a meta-element having a sub-wavelength shape dimension for electrically adjusting a phase change value for incident light $L_i$.

The optical phased array OPA may be an optical waveguide based on silicon photonics, in which the path of incident light $L_i$ is divided into a plurality of paths to direct incident light $L_i$ to output ends of the paths in a plurality of channels. The optical waveguide may include phase retarders respectively provided in the paths, and the degree of phase delay in the length and/or the phase retarder of each of the paths may be adjusted to vary the direction in which incident light $L_i$ is steered and output.

The optical phased array OPA steers incident light $L_i$ in a direction determined by a combination of phase changes of the incident light $L_i$ occurring in the channels CH1, CH2, etc. For example, the direction in which incident light $L_i$ is steered and output may be sequentially adjusted to directions $L_{S1}$, $L_{S2}$, and $L_{S3}$ according to the combination of phase changes.

Figure 5:
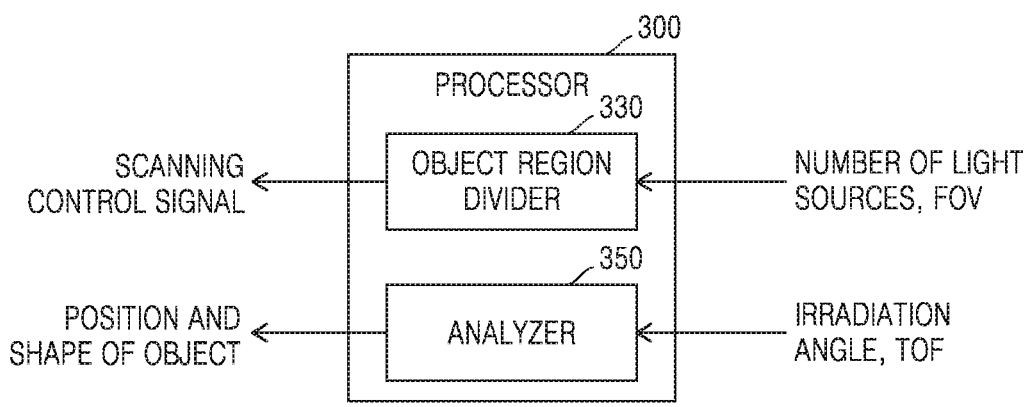
FIG. 5 is a block diagram illustrating an example structure of a processor of the LiDAR device shown in FIG. 2.
Figure 6:
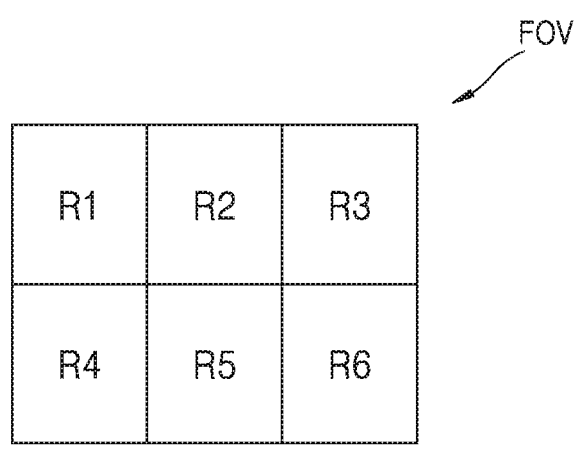
FIG. 6 is a view illustrating an example in which an object region is divided by the processor shown in FIG. 5.

FIG. 5 is a block diagram illustrating an example structure of the processor 300 of the LiDAR device 1000 shown in FIG. 2, and FIG. 6 is a view illustrating an example in which an object region is divided by the processor 300 shown in FIG. 5.

The processor 300 may include an object region divider 330 and an analyzer 350. Codes or program instructions for operating the object region divider 330 and the analyzer 350 may be stored in the memory of the LiDAR device 1000 and may be executed by the processor 300.

The object region divider 330 may divide a predetermined FOV, in which an object OBJ is included, into as many division regions as the number of the plurality of light sources of the LiDAR device 1000. FIG. 6 illustrates an example in which the FOV is divided into six division regions when the number of the plurality of light sources is six. However, this is merely an example. That is, the number or shape of division regions is not limited thereto.

The object region divider 330 may generate a scanning control signal and apply the scanning control signal to the scanning optical system 100 such that the division regions may be scanned by the scanning optical system 100. For example, when the beam steering device 180 is the scanning mirror SM shown in FIG. 4A, the scanning control signal may be a rotation drive control signal for controlling the direction and angle of rotation. When the beam steering device 180 is the optical phased array OPA shown in FIG. 4B, the scanning control signal may be a phase control signal to be applied to each channel. The phase control signal may be an electrical signal to be applied to the meta-elements of the channels, or may be a phase delay signal to be applied to the phase retarders of the channels.

The analyzer 350 may analyze the position and shape of the object OBJ by considering all of the irradiation angles of light projected onto the object OBJ and TOFs calculated based on the irradiation angles.

Figure 7:
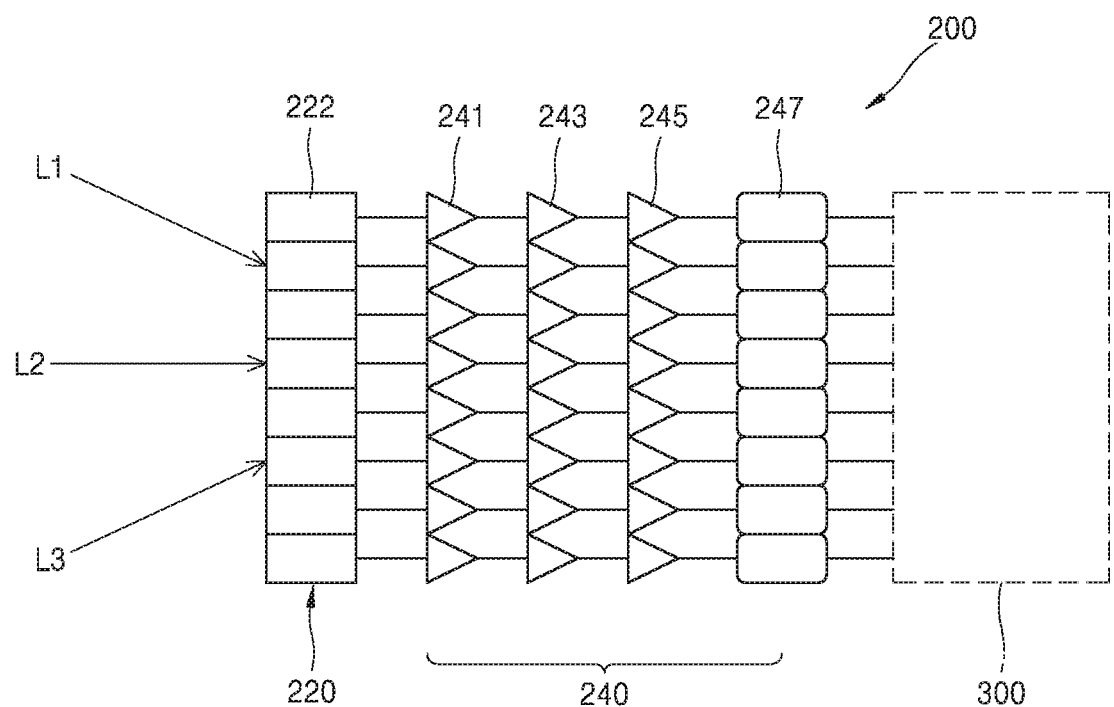
FIG. 7 is a view illustrating an example circuit configuration of the light detector of the LiDAR device shown in FIG. 2.

FIG. 7 is a view illustrating an example circuit configuration of the light detector 200 of the LiDAR device 1000 shown in FIG. 2.

The light detector 200 may include the light detection elements 222 and time counters 247 configured to measure TOFs of light detected by the light detection elements 222.

The light detector 200 may include a plurality of current-to-voltage conversion circuits 241 configured to convert currents output from the light detection elements 222 into voltages, a plurality of amplifiers 243 configured to amplify the voltages output from the current-to-voltage conversion circuits 241, and a plurality of peak detectors 245 configured to detect peaks in signals amplified by the amplifiers 243.

The light detection elements 222 may individually detect a plurality of light beams L1, L2, and L3 reflected from an object and may output corresponding current signals.

The current-to-voltage conversion circuits 241 may convert current signals output from the light detection elements 222 into voltage signals.

The amplifiers 243 may be amplify the voltage signals output from the current-to-voltage conversion circuits 241.

The peak detectors 245 may detect peaks in the voltage signals amplified by amplifiers 243. For example, the peak detectors 245 may detect peaks by detecting rising edges and falling edges in an electrical signal. Furthermore, the peak detectors 245 may detect peaks using a constant fraction discriminator (CFD) method. The peak detectors 245 may include comparators and may output detected peaks as pulse signals.

The time counters 247 may measure the TOFs of light beams detected by the light detection elements 222. When pulse signals are output from the peak detectors 245 to the time counters 247, each of the time counters 247 may measure the TOF of a light beam by counting the number of cycles in a clock signal from the start time of irradiation of the object OBJ by a light source. In addition, each of the time counters 247 may store information about the measured TOF of a light beam in a register. Each of the time counters 247 may be implemented by a time-to-digital converter (TDC).

Results of measurement by the time counters 247 may be transmitted to the processor 300, and the processor 300 may perform a data processing process using the results to analyze information about the object such as the position or shape of the object.

Figure 8:
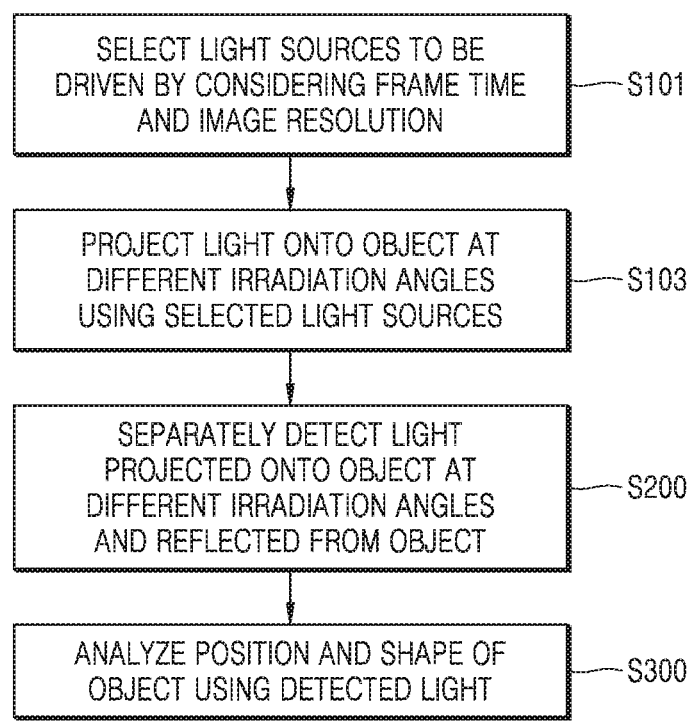
FIG. 8 is a flowchart schematically illustrating a method of driving a LiDAR device according to an example embodiment.

FIG. 8 is a flowchart schematically illustrating a method of driving a LiDAR device according to an example embodiment.

The method of driving a LiDAR device of the example embodiment differs from the method of driving a LiDAR device described with reference to FIG. 1 in that the number of light sources to be driven is selected, and light is projected to an object using the selected number of light sources. This method may be selectively used for the case in which it is not necessary to use all of the plurality of light sources together.

First, the number of light sources to be driven is selected by considering a frame time and image resolution (S101). The number of light sources may be one or more.

Next, light is projected onto an object at different irradiation angles using the selected light sources (S103). An FOV including the object is divided into regions according to the number of the selected light sources, and the regions may be scanned using the selected light sources. As described above, the different irradiation angles may be different from each other to an extent such that light beams may be separately detected.

Light projected onto the object at the different irradiation angles and reflected from the object is separately detected (S200), and information about the position and shape of the object is obtained using the detected light (S300).

According to the method of driving a LiDAR device of the example embodiment, information on an object may be obtained within a given frame time with an image resolution equal to or greater than a predetermined value. In this case, the number of light sources to be driven may be differently selected according to the range of an FOV required for analyzing the object.

Figure 9:
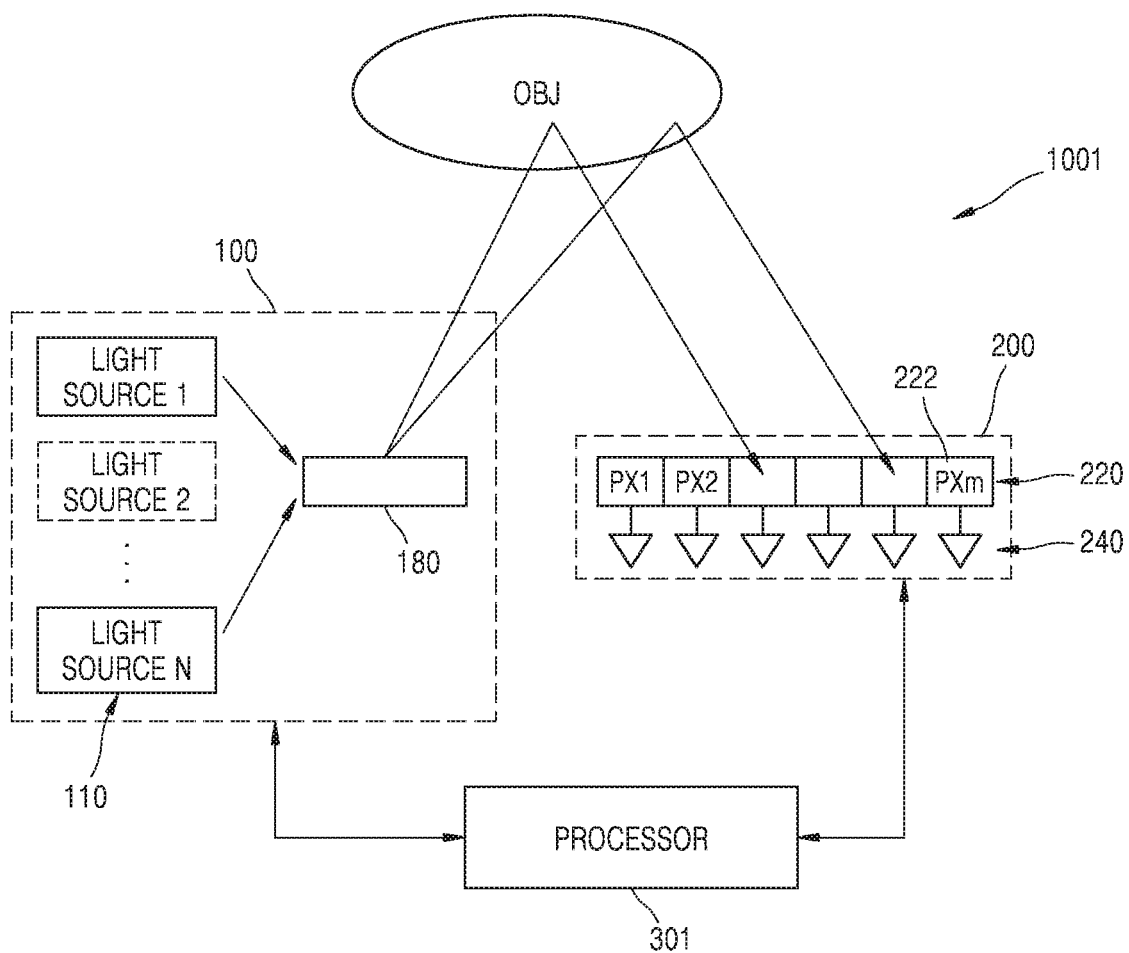
FIG. 9 is a block diagram schematically illustrating a LiDAR device according to an example embodiment.
Figure 10:
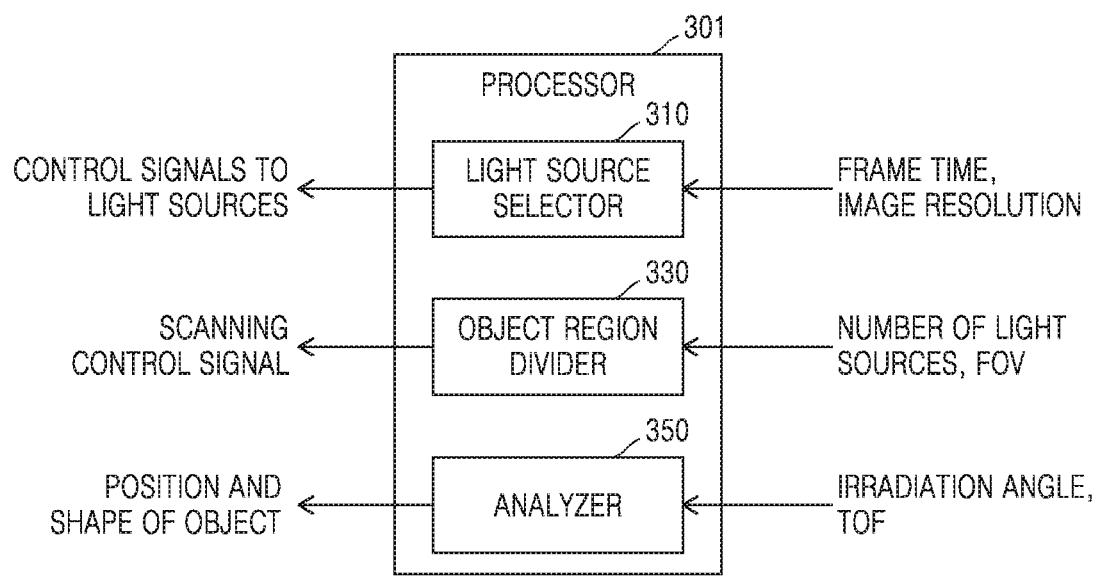
FIG. 10 is a block diagram illustrating an example structure of a processor of the LiDAR device shown in FIG. 9.

FIG. 9 is a block diagram schematically illustrating a configuration of a LiDAR device 1001 according to an example embodiment, and FIG. 10 is a block diagram illustrating an example configuration of a processor 301 of the LiDAR device 1001 shown in FIG. 9.

Referring to FIG. 9, the LiDAR device 1001 may include a scanning optical system 100 configured to scan an object OBJ with light, a light detector 200 configured to detect light projected from the scanning optical system 100 toward the object OBJ and reflected from the object OBJ, and the processor 301 configured to control the scanning optical system 100 and the light detector 200.

The scanning optical system 100 includes a light source unit 110 including a plurality of light sources and a beam steering device 180. The light source unit 110 and the beam steering device 180 may be arranged and driven such that the object OBJ may be scanned with light projected from the plurality of light sources toward the object OBJ through the beam steering device 180 at different irradiation angles.

The LiDAR device 1001 of the example embodiment is different from the LiDAR device 1000 of FIG. 2 in that the processor 301 drives the scanning optical system 100 after selecting light sources to be driven among the plurality of light sources of the light source unit 110 and setting the number of division regions to be formed by dividing an object region.

FIG. 9 illustrates an example in which two light sources, that is, a light source 1 and a light source N are selected as light sources to be driven. In this example, the processor 301 drives the light source unit 110 in such a manner that the light sources 1 and N emit light but the other non-selected light sources do not emit light.

Referring to FIG. 10, the processor 301 may include a light source selector 310, an object region divider 330, and an analyzer 350. Codes for operating the light source selector 310, the object region divider 330, and the analyzer 350 may be stored in a memory of the LiDAR device 1001 and may be executed by the processor 301.

The light source selector 310 sets the number of light sources to be driven by considering a given frame time and image resolution. The number of the light sources of the scanning optical system 100 may be selected as light sources to be driven.

The object region divider 330 may divide a predetermined FOV, in which the object OBJ is included, into as many division regions as the set number of light sources. The object region divider 330 may generate a control signal and apply the control signal to the scanning optical system 100 such that the division regions may be scanned by the scanning optical system 100. As described above, the scanning control signal may be a rotation drive control signal for controlling the rotation direction and the rotation angle of a scanning mirror SM or a phase control signal to be applied to each channel of an optical phase array OPA.

The analyzer 350 may analyze the position and shape of the object OBJ by considering all of the angles of light projected onto the object OBJ and TOFs calculated based on the angles.

The LiDAR devices 1000 and 1001 and the methods of driving the LiDAR devices 1000 and 1001 of the example embodiments make it possible to obtain more accurate information about a front object and may be employed in various electronic apparatuses. Examples of such various electronic apparatuses may include an autonomous drive apparatus such as an unmanned vehicle, an autonomous drive vehicle, an autonomous drive robot, or an autonomous drive drone, a mobile communication apparatus, and an Internet of Things apparatus.

Each of the LiDAR devices 1000 and 1001 of the example embodiments may include a processor; a memory for storing and executing program data, a permanent storage such as a disk drive, a communication port for communication with external devices, and a user interface device such as a touch panel, a key, or a button. Methods embodied as software modules or algorithms may be stored on a computer-readable recording medium as non-transitory computer-readable codes or program instructions executable by the processor. Examples of the computer-readable recording medium include magnetic storage media (e.g., read-only memories (ROMs), random-access memories (RAMs), floppy disks, and hard disks), and optical recording media (e.g., CD-ROMs and DVDs). The computer-readable recording medium may also be distributed over network coupled computer systems so that the computer-readable codes may be stored and executed in a distributed fashion. The medium may be read by a computer, stored in a memory, and executed by a processor.

The example embodiments may be implemented as functional blocks and various processing operations. The functional blocks may be implemented with various hardware and/or software configurations executing specific functions. For example, example embodiments may employ integrated circuit configurations such as a memory, processing, logic, a look-up table and the like capable of executing various functions upon control of microprocessors or other control devices. In a similar manner to that in which the elements of the example embodiments can be executed with software programming or software elements, the example embodiments may be implemented with a scripting language or a programming language such as C, C++, Java, assembler, and the like, including various algorithms implemented by a combination of data structures, processes, routines or other programming configurations. The functional aspects may be implemented by algorithms executed in one or more processors. Also, the example embodiments may employ conversional arts to establish an electronic environment, process signals and/or process data. Terms such as "mechanism," "element," "means," and "configuration" may be widely used and are not limited to mechanical and physical configurations. Such terms may have the meaning of a series of routines of software in association with a processor or the like.

Specific executions described herein are merely examples and do not limit the scope of the present disclosure. For simplicity of description, other functional aspects of conventional electronic configurations, control systems, software, and the systems may be omitted. Furthermore, line connections or connection members between elements depicted in the drawings represent functional connections and/or physical or circuit connections by way of example, and in actual applications, they may be replaced or embodied as various additional functional connection, physical connection or circuit connections.

According to the LiDAR devices and the methods of driving the LiDAR devices, image resolution may be increased in proportion to the number of point light sources.

According to the LiDAR devices and the methods of the driving the LiDAR devices, a higher image resolution and/or a wider FOV may be realized with respect to a given frame time, or a frame time may be shortened with respect to a given image resolution and a given FOV.

It should be understood that example embodiments described herein should be considered in a descriptive sense only and not for purposes of limitation. Descriptions of features or aspects within each example embodiment should typically be considered as available for other similar features or aspects in other embodiments.

While example embodiments have been described with reference to the figures, it will be understood by those of ordinary skill in the art that various changes in form and details may be made therein without departing from the spirit and scope as defined by the following claims.

What is claimed is:

1. A light detection and ranging (LiDAR) device comprising:
    a scanning optical system comprising a plurality of light sources and a beam steering device, the scanning optical system being configured to scan an object with a plurality of irradiation beams projected from the plurality of light sources toward the object at a plurality of irradiation angles, respectively;
    a light detector comprising a plurality of pixel regions that are configured to separately detect the plurality of irradiation beams projected toward the object at the plurality of irradiation angles and reflected from the object; and
    a processor configured to control the scanning optical system and the light detector, and obtain information about the object based on the plurality of irradiation beams detected by the light detector,
    wherein the processor is further configured to control the scanning optical system to select light sources from among the plurality of light sources, to be used to project the plurality of irradiation beams toward the object and to scan the object, and
    wherein the processor is further configured to set a number of the light sources to be used based on a reference period of time and an image resolution to process one image frame of the object.

2. The LiDAR device of claim 1, wherein an angle between the plurality of irradiation beams projected from the plurality of light sources toward the object is equal to or greater than an angle resolution of the light detector.

3. The LiDAR device of claim 1, wherein the plurality of pixel regions are provided in the light detector such that the plurality of irradiation beams that are projected onto the object at the plurality of irradiation angles and reflected from the object are incident on different pixel regions among the plurality of pixel regions.

4. The LiDAR device of claim 1, wherein an angle between the plurality of irradiation beams projected from the plurality of light sources toward the object is equal to or greater than 1°.

5. The LiDAR device of claim 1, wherein the plurality of light sources are configured to emit the plurality of irradiation beams toward the object simultaneously or within a predetermined period of time.

6. The LiDAR device of claim 5, wherein the predetermined period of time is 1 µs or less.

7. The LiDAR device of claim 1, wherein the processor is further configured to determine a distance to the object based on the plurality of irradiation angles and a time of flight of the plurality of irradiation beams reflected from the object and perform data processing to analyze a position of the object and a shape of the object.

8. The LiDAR device of claim 1, wherein the processor is further configured to control the scanning optical system to scan the object by dividing a region of the object into a number of regions corresponding to a number of the plurality of light sources.

9. The LiDAR device of claim 1, wherein the plurality of pixel regions comprise a plurality of light detection elements, respectively, and
    wherein each of the plurality of light detection elements comprise at least one of an avalanche photo diode and a single photon avalanche diode.

10. The LiDAR device of claim 1, wherein the light detector comprises:
    a plurality of time counters configured to respectively measure times of flight of the plurality of irradiation beams detected by the plurality of pixel regions.

11. The LiDAR device of claim 10, wherein the light detector further comprises:
    a plurality of current-to-voltage conversion circuits configured to convert a plurality of currents respectively output from the plurality of pixel regions into a plurality of voltages;
    a plurality of amplifiers configured to amplify the plurality of voltages respectively output from the plurality of current-to-voltage conversion circuits; and
    a plurality of peak detectors configured to respectively detect a plurality of peaks in a plurality of signals amplified by the plurality of amplifiers.

12. The LiDAR device of claim 1, wherein the beam steering device comprises a scanning mirror configured to adjust an irradiation angle of each of the plurality of irradiation beams projected from the plurality of light sources by mechanical rotation.

13. The LiDAR device of claim 1, wherein the beam steering device comprises an optical phased array configured to adjust an irradiation angle of each of the plurality of irradiation beams projected from the plurality of light sources by phase control.

14. A method of driving a light detection and ranging (LiDAR) device, the method comprising:
    projecting a plurality of irradiation beams toward an object at a plurality of irradiation angles using light sources selected from among a plurality of light sources, respectively;
    separately detecting the plurality of irradiation beams projected toward the object at the plurality of irradiation angles and reflected from the object; and
    obtaining information about a position and a shape of the object based on the detection,
    wherein the projecting the plurality of irradiation beams comprises setting a number of the light sources from among the plurality of light sources, to be used to project the plurality of irradiation beams toward the object, and
    wherein the number of the light sources to be used is set based on a reference period of time and an image resolution to process one image frame of the object.

15. The method of claim 14, wherein an angle between the plurality of irradiation beams projected from the plurality of light sources toward the object is equal to or greater than an angle resolution of a light detector.

16. The method of claim 14, wherein the plurality of irradiation beams are projected by the plurality of light sources toward the object simultaneously or within a predetermined period of time.

17. The LiDAR device of claim 1, wherein an image resolution of one image of the object is proportional to a number of the plurality of light sources.

* * * * *